United States Patent
Malzbender et al.

(10) Patent No.: US 6,853,398 B2
(45) Date of Patent: Feb. 8, 2005

(54) METHOD AND SYSTEM FOR REAL-TIME VIDEO COMMUNICATION WITHIN A VIRTUAL ENVIRONMENT

(75) Inventors: Thomas Malzbender, Palo Alto, CA (US); W. Bruce Culbertson, Palo Alto, CA (US); H. Harlyn Baker, Los Altos, CA (US); Michael E. Goss, Burlingame, CA (US); Daniel G. Gelb, Los Altos, CA (US); Irwin Sobel, Menlo Park, CA (US); Donald O. Tanguay, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 247 days.

(21) Appl. No.: 10/176,494

(22) Filed: Jun. 21, 2002

(65) Prior Publication Data

US 2003/0234859 A1 Dec. 25, 2003

(51) Int. Cl.[7] .............................................. H04N 7/14
(52) U.S. Cl. ........................... 348/14.09; 348/14.08; 348/14.16
(58) Field of Search .......................... 348/14.01–14.16; 709/204; 345/753, 757; 379/93.21, 93.23

(56) References Cited

U.S. PATENT DOCUMENTS

| | | | | |
|---|---|---|---|---|
| 5,491,743 A | * | 2/1996 | Shiio et al. .................. | 709/204 |
| 5,999,208 A | * | 12/1999 | McNerney et al. ...... | 348/14.08 |
| 6,191,808 B1 | | 2/2001 | Katayama et al. ............ | 348/39 |
| 6,208,373 B1 | | 3/2001 | Fong et al. ............... | 348/14.16 |
| 6,219,045 B1 | * | 4/2001 | Leahy et al. ................ | 709/204 |
| 6,259,470 B1 | * | 7/2001 | Koizumi et al. ........... | 348/14.1 |
| 6,414,707 B1 | * | 7/2002 | Agraharam et al. ..... | 348/14.07 |
| 6,466,250 B1 | * | 10/2002 | Hein et al. ............... | 348/14.16 |
| 6,583,808 B2 | * | 6/2003 | Boulanger et al. ....... | 348/14.09 |
| 6,724,417 B1 | * | 4/2004 | Hillis et al. .............. | 348/14.16 |

* cited by examiner

Primary Examiner—Wing Fu Chan

(57) ABSTRACT

A method for real-time video communication. Specifically, one embodiment of the present invention discloses a method of video conferencing that captures a plurality of real-time video streams of a local participant from a plurality of sample viewpoints. From the plurality of video streams, a new view synthesis technique can be applied to generate a video image stream in real-time of the local participant rendered from a second location of a second participant with respect to a first location of the local participant in a coordinate space of a virtual environment. A change in either of the locations leads to the modifying of the video image stream, thereby enabling real-time video communication from the local participant to the second participant.

42 Claims, 6 Drawing Sheets

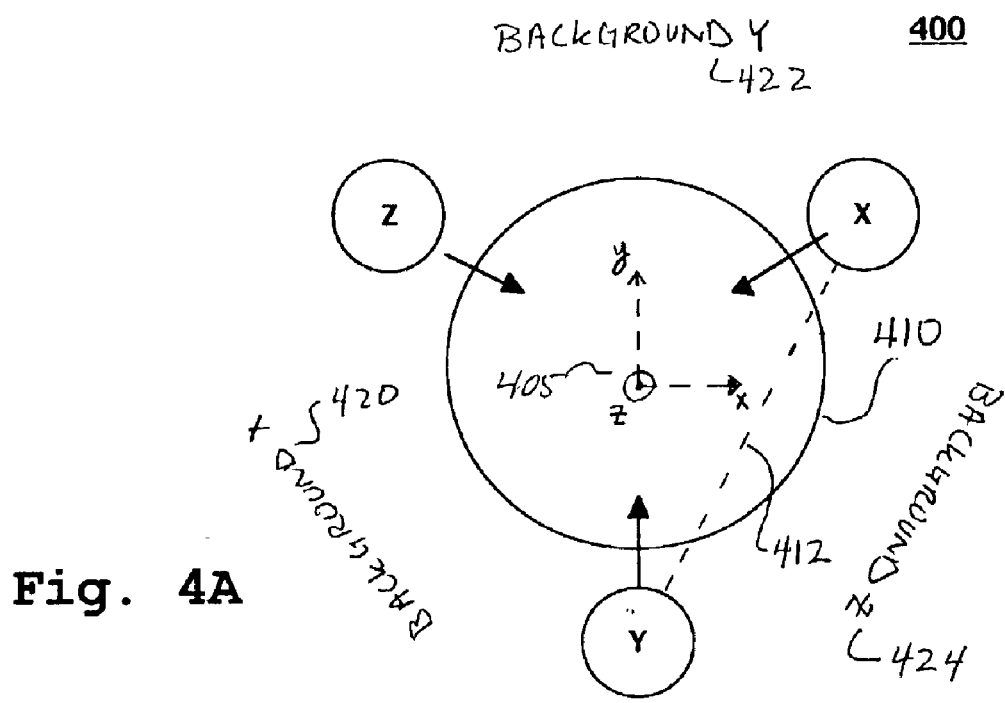
Fig. 4A
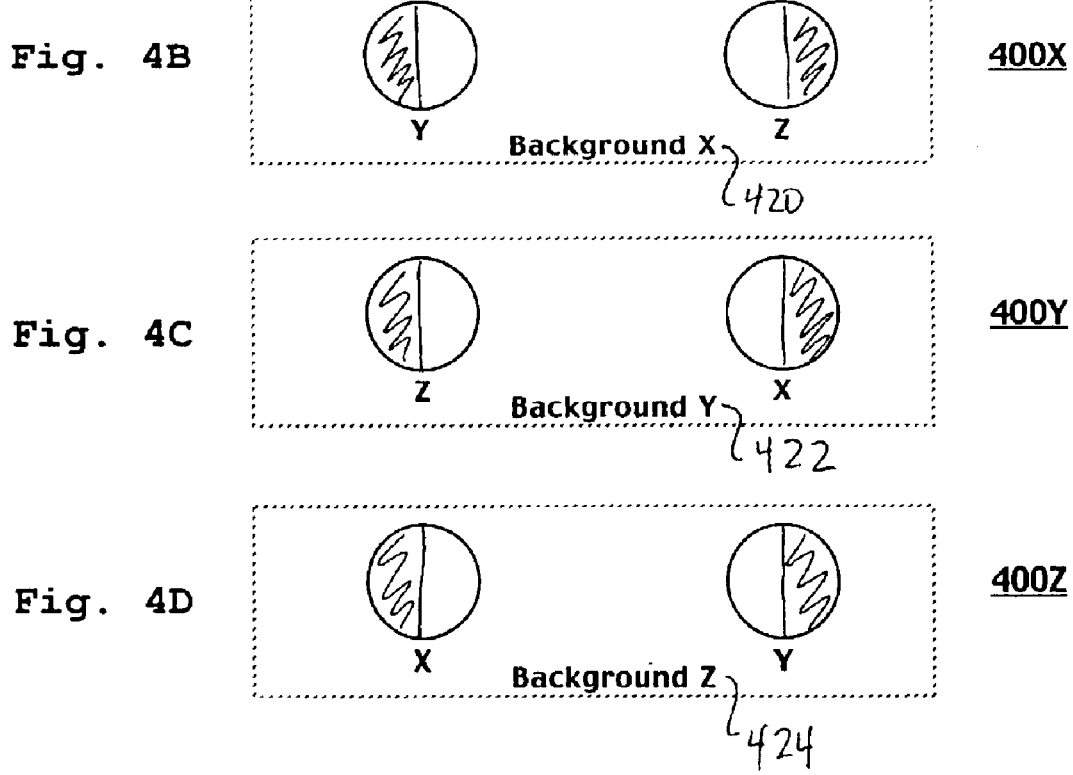
Fig. 4B
Fig. 4C
Fig. 4D

METHOD AND SYSTEM FOR REAL-TIME VIDEO COMMUNICATION WITHIN A VIRTUAL ENVIRONMENT

TECHNICAL FIELD

The present invention relates to the field of video conferencing, and more particularly to a method for enabling real-time video and audio communication within a shared virtual environment.

BACKGROUND ART

Video conferencing is an established method of collaboration between remotely located participants. A video image of a remote environment is broadcast onto a local display allowing a local user to see and talk to one or more remotely located participants.

One of the problems associated with video conferencing in the past is the lack of eye contact between participants. Typically, participants interact with the display for communicative purposes instead of the recording camera that is positioned to capture a video image of the local participant. For example, a display associated with a local user displays a video image of a remote participant. Interest of the local user is focused primarily on the display for communication. Users typically interact with images of participants on the display by talking to and gazing at the participants located on the display.

Since the recording camera can not physically be positioned exactly at the location of interest of the local participant, the center of the display, the remote participant will not see a face-on view of the local participant. The local user appears to be avoiding eye contact by gazing off in another direction. Moreover, the same problem exists at the display of the local user. The local user also views a video stream of the remote participant that is not face-on.

One approach to solving the problem of the lack of eye contact is to display a model of the facial features of a participant in a static synthetic environment. In this way, a model of the participant is created that is face-on. The model is created by substituting various facial features of the participant for the actual state of the facial feature. The facial features that are substituted in can be created from sample images of the participant. For example, a mouth can be in various emotional states, such as, a smile, or open denoting surprise. As the participant smiles and frowns in real time, a model is generated to reflect the smiles and frowns and is presented to the other participants.

However, the limitation of this approach is evident especially when errors in interpreting the visual features of the participant are displayed. For example, if a mouth of a participant is actually smiling, but a pursed lip is detected, then the model of the participant would display a pursed lip. Although the accompanying audio stream and other facial features may not correspond to the errant display of a pursed lip, the model would not appear to be in error, since all the facial features are reconstructed from actual images. A viewer of the model therefore would be unable to determine if an error occurred.

Moreover, because of current limitations of computing resources, in order for real-time display of the model to occur for real time video conferencing, for simplicity only a few facial features are reconstructed for exhibiting emotion. As such, the model may not appear realistic to the viewing participant. Also, since the model is reconstructed from sample images, the actual image of the participant is not transmitted to the viewing participant. As such, subtleties in emotion exhibited by the facial features cannot be represented by a model if the sample images do not contain the emotion, or if the reconstructed facial features do not encompass the facial feature of interest.

Another problem associated with previous implementations of video conferencing is the need for dedicated video conferencing facilities. Typically, all participants at one end (e.g., remote or local end) of the video conference need to be present within the same shared camera field of view for presentation to the other participants. This requires all the participants at one end to meet in a dedicated facility. Since equipment at the dedicated facility may be quite extensive and cost prohibitive, not everyone or every company has immediate access to the dedicated video conference facility. As such, video conferences must be scheduled in advance and participants must travel to the video conference facility, which precludes any impromptu video conferencing capabilities.

Also, since all the participants on one end of the video conference share an image of the remote scene, and there is only one audio channel for all participants, video conferencing in the past is most appropriate for one person talking at a time, while all the other participants listen. Simultaneous speakers over the audio channel would interfere with each other, such as, those holding side conversations. As such, all the participants are limited to participating in the main conversation of the video conference, which precludes any simultaneous conversations, or side conversations.

Therefore, prior art methods of video conferencing were unable to satisfactorily provide for adequate eye to eye contact between remotely located participants. Moreover, prior art techniques are unable to realistically show real-time emotional states of the participants in a video conference. Additionally, the inconvenience associated with the use of dedicated video conferencing facilities negates any impromptu video conferencing.

DISCLOSURE OF THE INVENTION

A method for real-time video communication. Specifically, one embodiment of the present invention discloses a method of video conferencing that begins by capturing a plurality of real-time video streams of a local participant from a plurality of sample viewpoints. From the plurality of video streams, a new view synthesis technique can be applied to generate a video image stream in real-time of the local participant rendered from a second location of a second participant with respect to a first location of the local participant in a coordinate space of a virtual environment. Generation of the video image stream can occur in real-time to provide for real-time video communication within the virtual environment. A change either of the first or second locations leads to the modifying of the video image stream, thereby enabling real-time video communication from the local participant to the second participant.

BRIEF DESCRIPTION OF THE DRAWINGS

FIG. 4A is an illustration of a virtual environment corresponding to a video conference including three participants, in accordance with one embodiment of the present invention.

FIG. 4B is a view of the virtual environment of FIG. 4A from the viewpoint of participant X of the video conference as shown on a display, in accordance with one embodiment of the present invention.

FIG. 4C is a view of the virtual environment of FIG. 4A from the viewpoint of participant Y of the video conference as shown on a display, in accordance with one embodiment of the present invention.

FIG. 4D is a view of the virtual environment of FIG. 4A from the viewpoint of participant Z of the video conference as shown on a display, in accordance with one embodiment of the present invention.

BEST MODES FOR CARRYING OUT THE INVENTION

Figure 1:
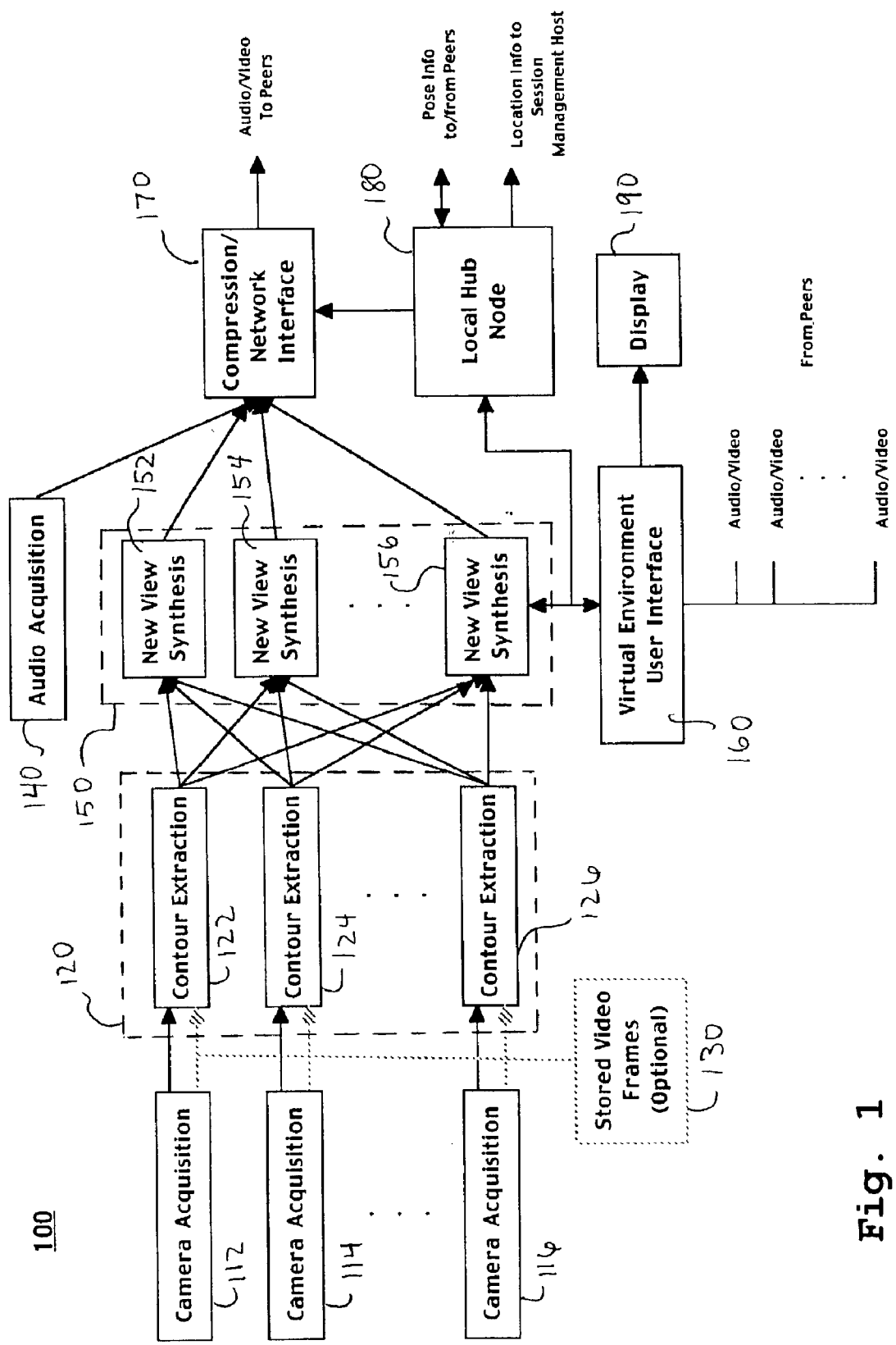
FIG. 1 is a schematic block diagram of an exemplary system at a local node for implementing a method of real-time video and audio communication within a shared virtual environment, in accordance with one embodiment of the present invention.

Reference will now be made in detail to the preferred embodiments of the present invention, a method of real-time audio and video communication within a virtual environment. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, and the like. This software program is operable for providing real-time video and audio communication within a virtual environment. In one embodiment, the computer system includes a processor coupled to a bus and memory storage coupled to the bus. The memory storage can be volatile or non-volatile and can include removable storage media. The computer can also include a display, provision for data input and output, etc.

Accordingly, the present invention provides a method and system for real-time audio and video communication in a virtual environment. Outputs in real-time of a local participant from the viewpoint of observing participants within the virtual environment are generated by new view synthesis techniques based on sample video streams of the local participant. Moreover, the output video streams can be modified to account for navigation by the local and observing participants through a coordinate space of the virtual environment. The outputs are sent to the observing participants.

The outputs can be graphically generated avatars that represent the local participant. The outputs are combined with three dimensional computer generated synthetic renderings of the background to provide for photo-realistic versions of the local participant within the virtual environment. Embodiments of the present invention are able to provide for eye to eye contact between participants using new view synthesis techniques that are superior to the prior art methods that could not compensate for camera angles that were off-center. Further, embodiments of the present invention are able to realistically show real-time emotional states of participants in the virtual environment.

While embodiments of the present invention are described within the context of a virtual environment that encompasses a video conference, other embodiments are well suited to other environments that provide for interaction between multiple participants within the virtual environment.

FIG. 1 is a block diagram illustrating a system 100 capable of performing real-time audio and video communication within a virtual environment, in accordance with one embodiment of the preset invention. System 100 is located at a local node, also referred to as a portal, associated with a local participant in the virtual environment. More particularly, each of the participants within the virtual environment can be associated with a system 100 for generating output audio and video streams for communication within the virtual environment.

Specifically, system 100 includes a plurality of camera acquisition modules. In one embodiment, the camera acquisition modules are digital recording video cameras. The plurality of camera acquisition modules includes n modules comprising camera acquisition modules 112, 114, on up to $n^{th}$ module 116.

Figure 2A:
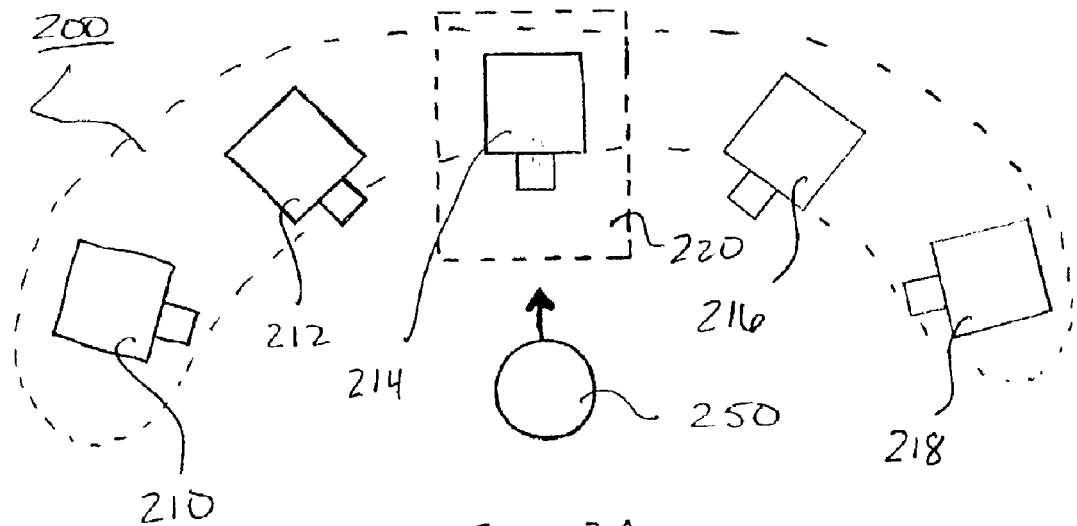
FIG. 2A is a block diagram of a cross-sectional top view of a desktop immersive video conferencing system at a local node for capturing video streams that are real-time of a local participant, in accordance with one embodiment of the present invention.
Figure 2B:
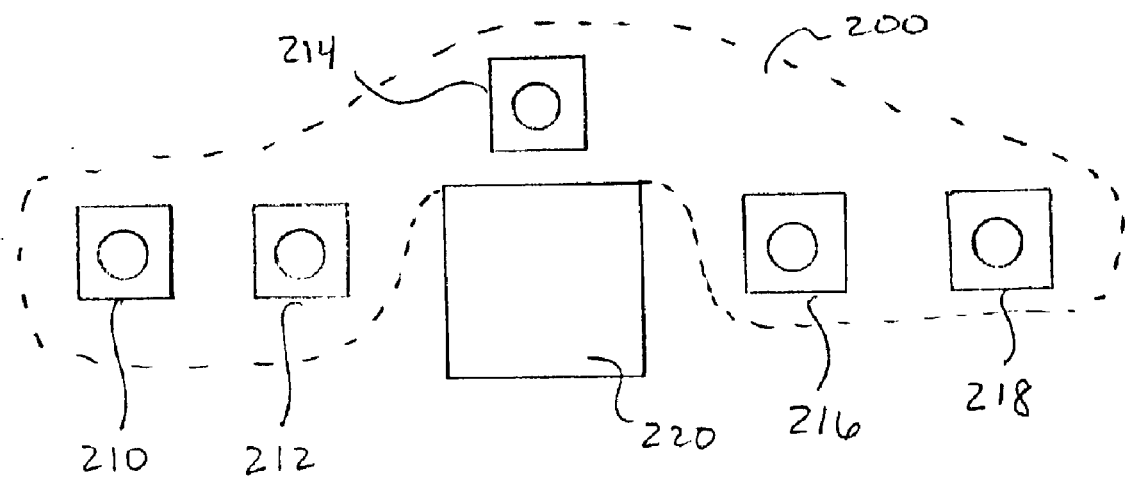
FIG. 2B is a block diagram of a cross-sectional front view of the desktop immersive video conferencing system of FIG. 2A for capturing video streams that are real-time of a local participant, in accordance with one embodiment of the present invention.

FIGS. 2A and 2B illustrate a block diagram of a unit 200 comprising a plurality of camera acquisition modules that surround a participant 250 that can be implemented within system 100. Referring to FIG. 2A, a cross-sectional view from the top of unit 200 is shown, in accordance with one embodiment of the present invention. In the present embodiment, the unit 200 consisting of five separate cameras (camera acquisition module 210, 212, 214, 216, and 218) can be placed on top of a conventional personal computer (PC) display 220 associated with the participant 250. Although five separate cameras are used in the present embodiment, it is possible to increase or decrease the number of cameras depending on image quality and system cost.

The five camera acquisition modules 210, 212, 214, 216, and 218 all face and wrap around the participant 250. The participant 250 faces the five camera acquisition modules. In addition, the unit 200 produces five video streams in real-time from multiple perspectives via the five camera acquisition modules 210, 212, 214, 216, and 218. From these multiple video streams, new view synthesis methods can be implemented to generate new views of the participant from arbitrary perspectives rendered from locations of other observing participants with respect to a location of the local participant within a coordinate space of the virtual environment. Generation of the new views can occur in real-time to provide for real-time audio and video communication within the virtual environment.

FIG. 2B is a cross-sectional front view illustrating the unit 200 of FIG. 2A comprising the plurality of camera acquisition modules 210, 212, 214, 216, and 218. As shown, the unit 200 can be a single unit that is attached directly to the display 220. Other embodiments are well suited to camera acquisition modules that are not contained within a single unit but still surround the participant 250, and to camera acquisition modules that are not attached directly to the display 220. The placement of camera acquisition module 214 is higher than the remaining camera acquisition modules 210, 212, 216, and 218, in the present embodiment; however, other embodiments are well suited to placement of the camera acquisition modules on a singular horizontal plane, for arbitrary placement of the camera acquisition modules, and/or for non-uniform displacement of the camera acquisition modules.

Returning back to FIG. 1, system 100 also contains a contour extraction module 120. The contour extraction module segments or separates out the local participant from each of the real-time video streams coming out of the camera acquisition modules 112, 114, and 116. Optional module 130 may store video frames that are generated from the camera acquisition modules 112 for alternative sources of video streams to be inputted into the contour extraction module 120 (e.g., for debugging purposes). The local participant in the foreground is separated from the physical background each of the video streams. In this way, the local participant is segmented out from his background in the physical world. Using new view synthesis techniques, a three dimensional model of the local participant is generated from a new view that is associated with an observing participant. Thereafter, an image based representation of the three-dimensional model can be virtually placed into a synthetic or virtual environment for communicative interaction with other observing participants.

Each of the participants within a communication session of a virtual environment are generating views of themselves using system 100 and sending these views to the other participants within the communication session. In this way, real-time video and audio communication is enabled between all the participants of a communication session.

As shown in FIG. 1, contour extraction is performed separately on each of the video streams from each of the camera acquisition modules 112, 114, and 116. For example, contour extraction is performed within contour extraction module 120 in block 122 on the real time video stream outputted by camera acquisition module 112 (the solid line) as well as stored video frames from module 130 (the dotted line). Separately, contour extraction is performed in module 120 in block 124 on the real-time video stream outputted by camera acquisition module 114 (the solid line) as well as stored video frames from module 130 (the dotted line). Also, contour extraction is performed separately in module 120 in block 126 on the real-time video stream outputted by camera acquisition module 116 (the solid line) as well as stored video frames from module 130 (the dotted line).

In order to segment the foreground from the physical background, the system 100 goes through a calibration stage. Initially, the first stage of operation is camera calibration. This operation allows the extraction of both intrinsic and extrinsic camera parameters for each of the camera acquisition modules (e.g., 112, 114, and 116). Intrinsic parameters are internal to each camera and include a quantification of the lens distortion parameters, focal length, field of view, aspect ratio, and color sensitivity. Extrinsic parameters include the camera pose, which is the orientation and position of each camera acquisition module in relation to the local participant (e.g. participant 250 in FIG. 2).

Next, multiple images are collected without a foreground participant present to build a background model for each pixel in each camera. This data may be stored in module 130 for purposes of contour extraction. The model is a statistical characterization that specifies what the mean and standard deviations for each color channel are at each sensor element when viewing the background. This allows for the segmentation of the user from the background in each of the camera views. Other background models can easily be implemented, such as, multimodal representations of color statistics, and mixtures of Gaussian distribution functions.

System 100 also includes a new view synthesis module 150 for generating new views of the local participant from the perspective of other remote, observing participants within the virtual environment. For each observing participant, their perspective is associated with a direction from the local participant to the respective observing participant within a coordinate space of the virtual environment. The direction is rendered from a location of the observing participant with respect to a location of the local participant within the coordinate space. A new view of the local participant is generated for each of the observing participants. The new views of the local participant are generated in real-time. For example, if there are m observing participants, m new views of the local participant are generated, one from each of the perspectives of the m observing participants.

Construction of each of the m new views is done with various new view synthesis techniques. The new view synthesis techniques reconstruct, from the various real-time video streams of the local participant taken from the multiple sample perspectives, a new view taken from a new and arbitrary perspective, such as, the perspective of an observing participant in the virtual environment. The new view of the local participant is then rendered from the reconstruction. The new view of the local participant is able to portray periods of eye-to-eye contact by the local participant to the observing participant. In other words, the new view that is generated is able to portray an eye contract view of the local participant, that is displayed on a display to the observing participant, during periods when the local participant is directly viewing an image of the observing participant. The image is obtained by the local participant from a second video image stream of the observing participant.

An intermediate step includes rendering a three dimensional model of the local participant from the perspective of the observing participant, from which the new view of the local participant is generated. The three-dimensional model is generated from the various real-time video streams of the local participant. The new view is rendered as a video image stream in two dimensions for blending within a synthetic rendering of the three dimensional virtual environment.

For example, within block 152 of the new view synthesis module 150, an output of a new view from the perspective of a first observing participant is reconstructed from video streams from each of the multiple sample perspectives associated with the camera acquisition modules 112, 114, and 116. The real-time video streams from each of the sample perspectives have extracted the local participant from the physical background in contour extraction module 120, and are inputted into block 152 of the new view synthesis module 150.

Correspondingly, block 154 within new view synthesis module 150 outputs a new video image stream of the local participant from the perspective of a second observing participant in the virtual environment. Also, block 156 within new view synthesis module 150 outputs a new video stream of the local participant from the perspective of the $m^{th}$ observing participant in the virtual environment. Each of the new video streams from the perspective of observing participants are reconstructed from video streams from each of the multiple sample perspectives associated with the camera acquisition modules 112, 114, and 116 that have extracted the local participant from the physical background.

System 100 also includes an audio acquisition module 140. Module 140 can include a microphone for receiving audio input in real-time of the local participant. The audio input can be combined in the compression/network interface module 170 with the video streams from the perspective of the observing participants to generate photo-realistic renderings of the local participant for real-time interaction.

From module 170, the video and audio streams are sent directly to the corresponding observing participants over a peer-to-peer communication connection, in one embodiment. The peer-to-peer communication minimizes the amount of processing on the audio/video data to ensure real-time interaction.

In addition, system 100 also includes a virtual environment user interface module 160. Module 160 provides for local participant interaction within the virtual environment. Each participant can control the virtual position within the virtual environment of an associated virtual avatar that represents that participant. Although the present embodiment uses the mouse or the cursor keys to move the local participant throughout the virtual environment, other input modalities can be used as well. For example, user interface module 160 can be used to effect movement of the virtual avatar representing the local participant within the virtual environment. Also, user interface module 160 can be used to rotate the virtual avatar representing the local participant about a vertical axis in the virtual environment. This defines an orientation of the virtual avatar representing the local participant within a coordinate system of the virtual environment. This allows the local participant to get various views of a viewpoint encompassing 360 degrees at a particular location within the virtual environment.

In addition, module 160 receives the input audio streams and corresponding video image streams associated with the observing participants that are communicating with the local participant within the virtual environment. The input audio streams and corresponding video image streams are sent from the observing participants. A separate audio stream and corresponding video image stream is generated of each of the observing participants from the perspective of the local participant within the virtual environment, and is associated with a direction of the local participant from the respective observing participant within the coordinate space of the virtual environment. These audio streams and video image streams can be generated on a system 100 that is located at each of the physical locations of the observing participant. In this way, each of the participants within a virtual environment can participate in a communication session although they may be physically located in remote locations. In one embodiment, the user interface module 160 blends the video image streams from the observing participants within a synthetic rendering of the three dimensional virtual environment.

A display 190 is coupled to the user interface for viewing the virtual environment from the perspective of the local participant. Depending on the orientation of the local participant, each of the video streams from the observing participants can be viewed on the display 190. Due to limited field of view of the display 190, warpings and deformation of the virtual space as shown on the display 190 will allow wider views of the virtual environment, in one embodiment. Although this may introduce geometric inconsistencies between the virtual world and the physical display, photo-realistic images of the participants are still readily available, such as eye to eye contact within that distorted space.

System 100 also includes a local hub node 180 for coordinating with a central host (not shown) responsible for session management, in accordance with one embodiment of the present invention. For example, the local hub node 180 contacts the central host to either join an existing communication session within the virtual environment or create a new communication session. In the case where the local participant is joining an existing session, the central host notifies each of the local hub nodes located at the portals for those participating in the communication session that there is a new participant. The new portal location (the local hub node 180) is initialized and from then on all participants of a communication session notify each other of any position updates in the virtual environment. This can be done on a peer to peer connection to facilitate real-time interaction within the virtual environment.

Figure 3:
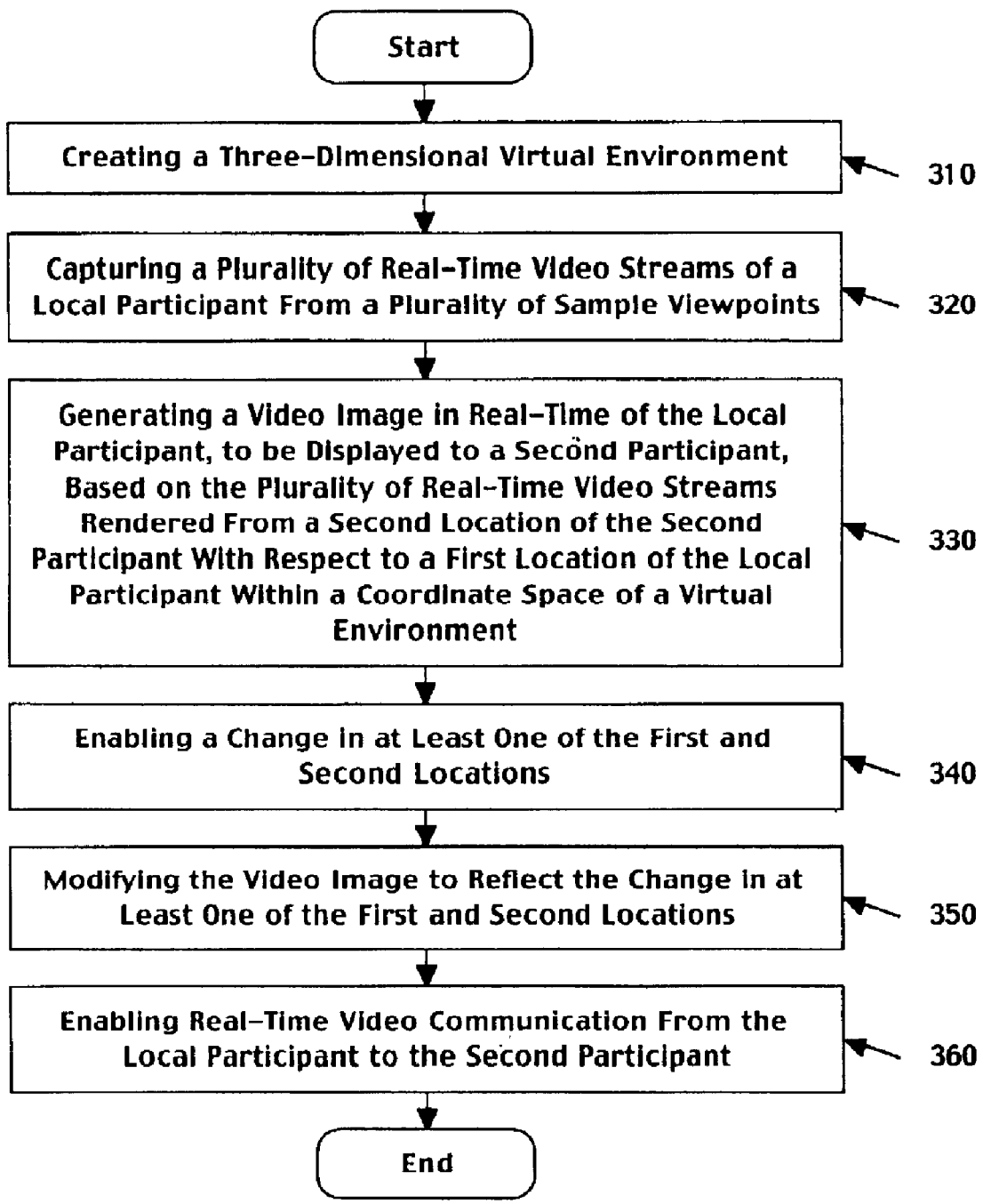
FIG. 3 is a flow diagram illustrating steps in a computer implemented method for implementing real-time video and audio communication within a shared virtual environment, in accordance with one embodiment of the present invention.

FIG. 3 is a flow chart 300 illustrating steps in a computer implemented method for real-time audio and video communication within a virtual environment, in accordance with one embodiment of the present invention. The present embodiment begins by creating a three dimensional virtual environment in step 310. In one embodiment, the three dimensional virtual environment is a conference room, wherein a communication session is conducted between a local participant and a second participant. Other embodiments are well suited to various other virtual environment (e.g., video gaming environments), as well as one or more communication session conducted between multiple participants within the virtual environment.

In step 320, the present embodiment continues by capturing a plurality of real-time video streams of a local participant in step 320. The plurality of real-time video streams are taken from a plurality of sample viewpoints partly surrounding the local participant. For example, the plurality of real-time video streams can be captured from the various camera acquisition modules 112, 114, on up to the n$^{th}$ module 116 of FIG. 1.

In step 330, the present embodiment proceeds by generating an output video image stream in real-time of a local participant. The output video stream is rendered from a location of a second participant within respect to a location of the local participant within a coordinate space of a virtual environment. The output video stream is rendered from a direction of the second participant from the local participant and defines a perspective of the local participant by the second participant within the virtual environment. In other words, the output video stream is rendered from a location of the second participant with respect to a location of the local participant. Thereafter a new view synthesis technique is applied to the plurality of real-time video streams to reconstruct and generate the output video image stream. In one embodiment, the output video image stream can portray an eye contact view of the local participant to the second participant when the local participant is directly viewing an image of the second participant. The image of the second participant is rendered from a second video image stream in real-time of the second participant and sent by the second participant.

In step 340, the present embodiment enables a change in the locations of the first and second participants. In one embodiment, the local and second participants are free to navigate around in the virtual environment. Navigation by either the local or second participant will affect the direction from which the perspective is taken that is associated with the second participant. The direction corresponds to the changed locations of the local and second participant in the virtual environment.

In step 350, the present embodiment proceeds by modifying the output video image stream to reflect the change in locations of the first and second participants. As such, the second participant has a real-time view of the virtual environment that reflects movement by either the local participant or the second participant. This is analogous to motion in the real physical world.

In step 360, the present embodiment proceeds by enabling real-time video communication in a communication session from the local participant to the second participant. In another embodiment, a real-time audio stream is captured of the local participant. The real-time video image stream and audio stream are then sent to the second participant for communicative purposes to enable real-time video and audio communication from the local participant to the second participant.

The local participant interacts with an input video image stream of the second participant within the virtual environment as shown on a display associated with the local participant. In one embodiment, the input video image stream can be a graphically generated avatar that is rendered within a synthetic rendering of the three dimensional virtual environment The graphically generated avatar represents the second participant. The real-time video image stream is generated using the method as described in flow chart 300 of FIG. 3, in one embodiment.

In another embodiment, the local participant generates a second video image stream in real-time of the local participant corresponding to a second direction of a third participant in the communication session. The second direction is rendered from a location of the third participant with respect to a location of the local participant. The second direction is directed from the local participant to the third participant within the coordinate space of the virtual environment. The second video image stream is generated by applying the new view synthesis technique on the plurality of real-time video streams. In addition, the local participant and the third participant can navigate through the virtual environment effecting a change in the second direction. Correspondingly, the second video image stream is modified to reflect this change in the second direction.

The local participant and the second participant are associated with a communication session within the virtual environment, in accordance with one embodiment of the present invention. The virtual environment may include other participants beyond the local participant and the plurality of observing participants. The virtual environment may also include numerous communication sessions occurring simultaneously and independently of each other.

The positioning and orientation of each of the plurality of video image streams representing the plurality of observing participants within the coordinate space of the virtual environment is known to the local participant through position information from the central host that manages the virtual environment, or by peer to peer communication between each of the participants in the communication session. As such, representation of the plurality of graphically generated avatars representing the plurality of observing participants can be accomplished on the display of the local participant.

In addition, the real-time video features from the plurality of observing participants are incorporated within the plurality of graphically generated avatars. The local participant receives a plurality of input video image streams that include the real-time video features representing the plurality of observing participants. The plurality of input video image streams can be rendered by the plurality of graphically generated avatars within the virtual environment. For example, since the relative location of the local participant with respect to a location of a selected observing participant is known, the selected observing participant can calculate the direction representing the perspective of the local participant within the coordinate space of the virtual environment. The selected participant can then generate an output video stream corresponding to that perspective, and send the output video stream to the local participant.

Since the virtual camera view displayed to the local participant can be made to correspond with the position of local participant's virtual head, eye contact happens naturally between the local participant and observing participants. As such, natural communication is preserved between the participants of a communication session. For example, emotional displays of the participants are picked up by the video image streams corresponding to those participants and are sent to the other participants in the communication session for photo-realistic display with corresponding avatars. Nervousness that is associated with purposeful dodging of eye contact is also preserved.

Correspondingly, an output audio stream in real-time is captured corresponding to the local participant. This output audio stream is transferred along with the plurality of output video image streams to the plurality of observing participants. In this way, the observing participants can also display the video image stream representing the local participant, including video features of the local participant, for display upon their local monitors. This enables real-time audio and video communication between the local participant and the plurality of observing participants within the communication session contained in the virtual environment.

The FIGS. 4A–D and 5A–D are illustrations of a virtual environment 400 in a communication session that is a virtual video conference, in accordance with embodiments of the present invention. The virtual environment 400 is a conference room. The communication session includes three participants X, Y, and Z. Each of the participants X, Y, and Z sit around a conference table 410 in the virtual environment 400. The arrows pointing out from each of the circles representing the participants X, Y, and Z illustrate the orientation of each of the participants within a coordinate space of the virtual environment. The FIGS. 4A–D and 5A–D illustrate the viewpoints of each of the participants both before and after navigation of participant Y and Z within the virtual environment 400.

Each of the participants X, Y, and Z have an associated location within a coordinate x, y, and z space 405 of the three dimensional virtual environment 400. The z-axis is seen coming out of the page. Although embodiments of the present invention are discussed within the context of a three dimensional rendering of the virtual environment, other embodiments of the present invention are well suited to multi-dimensional renderings of the virtual environment to include two dimensions.

FIG. 4A illustrates the locations and orientations of the participants X, Y, and Z within the virtual environment 400. In FIG. 4A, the participants are approximately equidistant from each other around the table 410. The orientation of the participants within the coordinate space of the virtual environment 400 is inward toward the center of table 410.

Each of the participants is free to control his/her viewpoint of the virtual environment without affecting the viewpoint of the other participants. This is in contrast to typical video conferencing scenarios where changing the camera position will affect the viewpoint of all the viewers. As such, the background seen by each of the participants will vary depending on the location and the orientation within the coordinate space of the virtual environment of each of the participants. For example, in FIG. 4A, participant X will see background X 420, participant Y will see background Y 422, and participant Z will see background Z 424.

FIG. 4A also illustrates directions from which video image streams are generated for both participants X and Y. Dotted line 412 illustrates the directions for both participants X and Y. For example, a video image stream generated by participant X, from the perspective of participant Y, corresponds to a direction from participant X to participant Y illustrated by line 412 within the coordinate space of the virtual environment 400. The direction corresponds to, or is rendered from, the location of participant Y with respect to the location of participant X in the coordinate space 405 of the virtual environment 400. As such, the video image stream generated by participant X will show an image of the left side of participant X's face that is off center by approximately 30 to 40 degrees.

Similarly, a video image stream generated by participant Y, from the perspective of participant X, corresponds to a direction from participant Y to participant X that is also illustrated by line 412. The direction is rendered from a location of participant X with respect to the location of participant Y in the coordinate space 405 of the virtual environment 400. As such the video image stream generated by participant Y will show an image of the right side of participant Y's face that is off center by approximately 30 to 40 degrees.

FIG. 4B illustrates the viewpoint 400X of participant X of the virtual environment 400 as would be shown on a display, in accordance with one embodiment of the present invention. Participant X views both participant Y and Z. From the viewpoint of the virtual environment and orientation of participant X, the majority of the right side of participant Y's face is shown, and the majority of the left side of participant Z's face is shown. Both participant Y and Z would be placed within background X 420. In other words, the video image streams for participant Y and Z can be blended with a synthetic rendering of the three dimensional virtual environment from the viewpoint of participant X.

FIG. 4C illustrates the viewpoint 400Y of participant Y of the virtual environment 400 as would be shown on a display, in accordance with one embodiment of the present invention. Participant Y views both participant X and Z. From the viewpoint of the virtual environment and orientation of participant Y, the majority of the right side of participant Z's face is shown, and the majority of the left side of participant X's face is shown. Both participant X and Z would be placed within background Y 422. In other words, the video image streams for participant X and Z can be blended with a synthetic rendering of the three dimensional virtual environment from the viewpoint of participant Y.

FIG. 4D illustrates the viewpoint 400Z of participant Z of the virtual environment 400 as would be shown on a display, in accordance with one embodiment of the present invention. Participant Z views both participant X and Y. From the viewpoint and orientation of participant Z, the majority of the right side of participant X's face is shown, and the majority of the left side of participant Y's face is shown. Both participant X and Y would be placed within background Z 424. In other words, the video image streams for participant X and Y can be blended with a synthetic rendering of the three dimensional virtual environment from the viewpoint of participant Z.

Figure 5A:
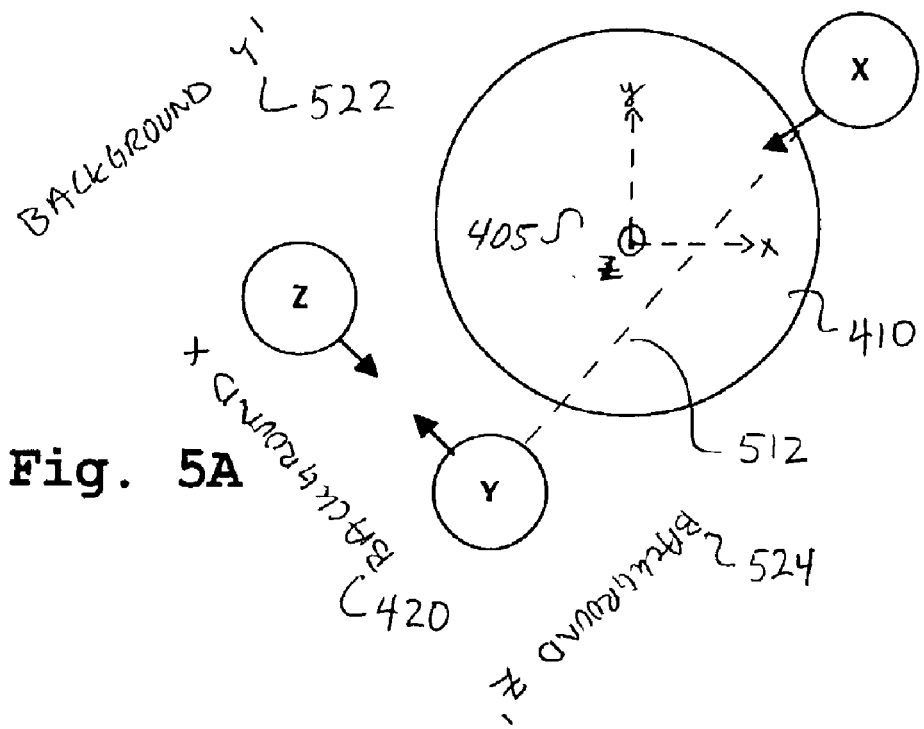
FIG. 5A is a diagram of a virtual environment corresponding to the video conference as introduced in FIG. 4A illustrating movement of the participants within the virtual environment, in accordance with one embodiment of the present invention.

FIG. 5A illustrates the relative positions of participants X, Y, and Z after navigation by participant Y and Z. As shown in FIG. 5A, participant Y and Z have moved closer together and are facing each other in the coordinate space of the virtual environment 400. These two participants Y and Z may be conducting a side conversation within the video conference communication session.

In one embodiment, the degree of audio coupling is a function of the distance between two participants. Closer individuals have stronger audio coupling, just as in the real physical world. As such, private side conversations can be enabled just by moving closer in the virtual environment. In addition, in another embodiment, private side conversations can be enabled if so specified by participants that is not a function of distance. In this case, eavesdropping participants outside of the selected side conversation would not be able to receive any audio streams from the participants in the side conversation no matter how close in proximity the eavesdropping participant is to the participants in the side conversation. As a result, in a single immersive video conferencing system, multiple side conversations can be taking place simultaneously and independent of each other within the communication session in the virtual environment 400. In another embodiment participants outside the side communication would receive audio streams of the participants in the side communication that is modulated with reduced volumes to reflect distance. This is to mimic a real life conference room with multiple conversations taking place.

In FIG. 5A, the background seen by the participants may have shifted due to the navigation of the participants. For participant X, the background X remains the same. However participant Y sees a new background Y' 522. Also, participant Z sees a new background Z' 522 of the virtual environment 400. Correspondingly, the orientation of participant Y and Z has changed within the virtual environment 400. The orientation of participant Y in FIG. 5A has rotated counter clockwise by 20–30 degrees from an orientation of FIG. 4A to face participant Z. Also, the orientation of participant Z in FIG. 5A has rotated clockwise by approximately 20–30 degrees from an orientation of FIG. 4A to face participant Y.

FIG. 5A also illustrates the change in directions from which video image streams are generated for both participants X and Y from FIG. 4A to FIG. 5A. Dotted line 512 illustrates the directions for both participants X and Y. For example, a video image stream generated by participant X, from the perspective of participant Y, corresponds to a changed direction from participant X to participant Y illustrated by line 512 within the coordinate space of the virtual environment 400. The changed direction is rendered from a location of participant Y with respect to a location of participant X, within the coordinate space 405 of the virtual environment. This line of direction 512 and perspective of participant Y has changed from the direction illustrated by line 412 of FIG. 4A, since participant Y has navigated to a new location. As such, the video image stream now generated by participant X is modified from the video image stream associated with the perspective of participant Y of FIG. 4A to show an image of the left side of participant X's face that is now slightly off center by approximately 10 to 20 degrees.

Similarly, a video image stream generated by participant Y, from the perspective of participant X, corresponds to a changed direction from participant Y to participant X that is also illustrated by line 512. This line of direction 512 and perspective of participant X has changed from the direction illustrated by line 412 of FIG. 4A since participant Y has navigated to a new location. The changed direction is rendered from a location of participant X with respect to a location of participant Y, within the coordinate space 405 of the virtual environment 400. As such the video image stream generated by participant Y will show an image of the right side of participant Y's face that is off center by approximately 80 to 100 degrees.

Figure 5B:
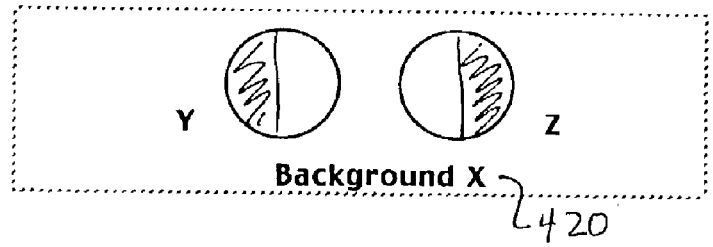
FIG. 5B is a view of the virtual environment of FIG. 5A from the viewpoint of participant X of the video conference as shown on a display illustrating the change in viewpoint resulting from a movement of the participants, in accordance with one embodiment of the present invention.

FIG. 5B illustrates the viewpoint 500X of participant X of the virtual environment 400 as would be shown on a display, in accordance with one embodiment of the present invention. Participant X views both participant Y and Z in closer proximity to each other than previously shown in FIG. 4B. From the viewpoint and orientation of participant X, the right side of participant Y's face is shown, and the left side of participant Z's face is shown. Both participant Y and Z would be placed within background X 420.

Figure 5C:
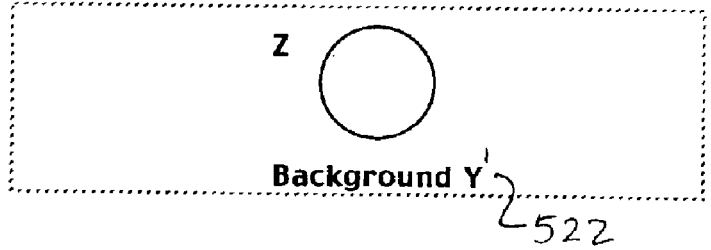
FIG. 5C is a view of the virtual environment of FIG. 5A from the viewpoint of participant Y of the video conference as shown on a display illustrating the change in viewpoint resulting from a movement of the participants, in accordance with one embodiment of the present invention.

FIG. 5C illustrates the viewpoint 500Y of participant Y after navigation in the virtual environment 400 as would be shown on a display, in accordance with one embodiment of the present invention. Participant Y views participant Z only. From the viewpoint and orientation of participant Y, all of participant Z's face is shown. Participant X, on the edge of the periphery, is not seen within the viewpoint of participant Y. Participant Z would be placed within background Y' 522.

Figure 5D:
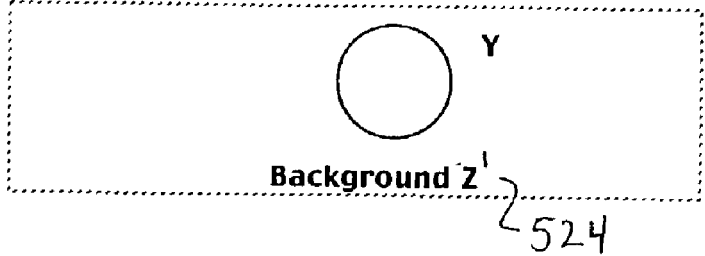
FIG. 5D is a view of the virtual environment of FIG. 5A from the viewpoint of participant Z of the video conference as shown on a display illustrating the change in viewpoint resulting from a movement of the participants, in accordance with one embodiment of the present invention.

FIG. 5D illustrates the viewpoint 500Z of participant Z after navigation in the virtual environment 400 as would be shown on a display, in accordance with one embodiment of the present invention. Participant Z views participant Y only. From the viewpoint and orientation of participant Z, all of participant Y's face is shown. Participant X, on the edge of the periphery, is not seen within the viewpoint of participant Z. Participant Y would be placed within background Z' 524.

Figure 6:
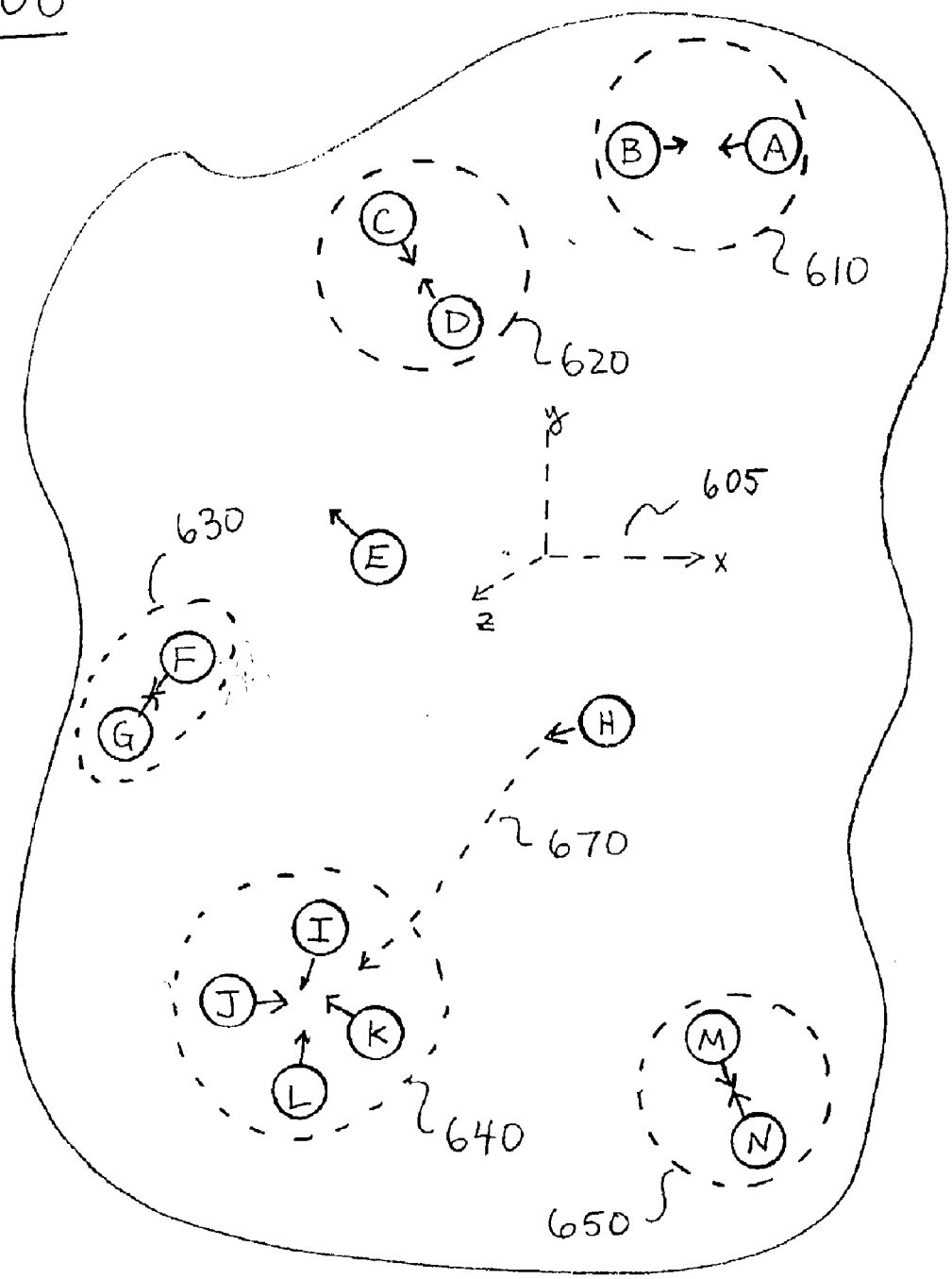
FIG. 6 is a diagram of a virtual environment illustrating multiple communication sessions within the virtual environment that are simultaneous and independent of each other, in accordance with one embodiment of the present invention.

FIG. 6 is a diagram of a virtual environment 600 illustrating multiple communication sessions that are conducted simultaneously and independently of each other, in accordance with one embodiment of the present invention. The virtual environment 600 can be a virtual ballroom, analogous to a virtual chatroom in the audio realm, where each of the participants in the virtual environment 600 are free to roam around a coordinate space 605 of the virtual environment 600, and interact with those participants within his/her local vicinity. The present embodiment allows for much larger assemblies of participants than video conferencing techniques in the prior art, since the view produced for each participant is unique.

In another embodiment, participants can select remote participants in the virtual space to enable private conversations without moving to a close physical location in the coordinate space of the virtual environment 600.

The virtual environment 600 includes participants A–N. FIG. 6 illustrates the relative locations of each of the participants A–N within the coordinate space 605 of the virtual environment 600. The arrows pointing out from each of the circles representing the participants A–N illustrate the orientation of each of the participants A–N within a coordinate space of the virtual environment 600.

Each of the participants A–N represented in the virtual environment 600 are located in independent and remote locations coupled together through a communication network, in accordance with one embodiment. In another embodiment, one of the participants A–N is an object.

Multiple communication sessions 610, 620, 630, 640, and 650 are being held simultaneously and independently of each other. Communication session 610 includes participants A and B that are conducting real-time audio and video communication. Communication session 620 includes participants C and D that are conducting real-time audio and video communication. Communication session 630 includes participants F and G that are conducting real-time audio and video communication. Communication session 640 includes participants I, J, K and L that are conducting real-time audio and video communication. Communication session 650 includes participants M and N that are conducting real-time audio and video communication.

Participants E, and H in the virtual environment 600 are not part of any communication session. However, FIG. 6 illustrates the navigation of participant H along path 670 from a start location away from the location of the participants in communication session 640 to an end location that is within close proximity to the participants in the communication session 640. As such, participant H has effectively joined in communication session 640.

In a communication session with multiple observing participants (e.g., communication session 640), a plurality of output video image streams corresponding to a plurality of perspectives associated with the observing participants is generated by a local participant, in accordance with one embodiment of the present invention. The plurality of observing participants are participating in a communication session with the local participant within the virtual environment. Thereafter, a new view synthesis technique is applied to a plurality of real-time video streams captured at the local participant to reconstruct and generate each of the plurality of output video image streams.

By virtue of the coordinate space 605 in virtual environment 600, proper scaling of the plurality of output image streams of the local participant is preserved. As such, images of the local participant can be scaled appropriately to reflect the relative distances between the local participant and each of the plurality of observing participants. For example, the video image streams of participant M from the perspectives of participants H and D will be appropriately scaled to reflect their distances away from participant M. As such, the image of participant M associated with the perspective of participant D will be smaller than the image of participant M associated with the perspective of participant H.

The local participant and the observing participants are free to navigate around in the virtual environment. Navigation by either the local participant, or any of the observing participants will change both the local perspective of the virtual world and the positions of the observing participants within that local perspective. The perspectives are associated with directions associated with locations of each of the plurality of observing participants with respect to a location of the local participant. Navigation by the local participant will change its apparent location within the virtual environment as viewed by the other observing participants. Correspondingly, each of the perspectives of the observing participants of the virtual world will also change with navigation by those observing participants.

With a change in direction, the present embodiment proceeds by modifying corresponding output video image streams to reflect the changes in the plurality of inward perspectives. As such, the local participant has a real-time view of the virtual environment that reflects both movement by the local participant and movement by the observing participants within the virtual environment.

Real time visual and audio communication between the local participant and the plurality of observing participants within the shared virtual environment is enabled. The local participant interacts with the plurality of video image streams that can be graphically generated avatars rendered within a synthetic rendering of the three dimensional virtual environment. The graphically generated avatars is displayed within the virtual environment that is displayed to the local participant. In this way, photo-realistic images of the observing participants are presented to the local participant in real-time to effectuate real-time communication between the local participant and the plurality of observing participants.

The present invention can be implemented within the context of a desktop approach, in accordance with one embodiment of the present invention. As such, participants that are located remotely in physical space can interact with each other in a photo-realistic audio and video manner in close proximity in a virtual environment.

Moreover, unlike conventional video conferencing techniques, each participant not only has his own system of cameras, but also their own microphones. This allows for quick recognition of which participant is speaking within a virtual environment. If sufficient amplitude is originating from the users microphone, then that participant is speaking. In another embodiment, in conjunction with a speech recognition system, this would allow for automatic transcription of the dialog in a meeting. The speech recognition problem itself is also more tractable since independent microphones introduces less interference.

The preferred embodiment of the present invention, a method for audio and video communication within a shared virtual environment, is thus described. While the present invention has been described in particular embodiments, it should be appreciated that the present invention should not be construed as limited by such embodiments, but rather construed according to the below claims.

What is claimed is:

1. A method of video conferencing comprising:
   a) creating a virtual environment in three dimensions;
   b) capturing a plurality of real-time video streams of a local participant from a plurality of sample viewpoints;
   c) generating a video image stream in real-time of said local participant to be displayed to a second participant by applying a new view synthesis technique to said plurality of real-time video streams, said video image stream rendered from a second location of said second participant with respect to a first location of said local participant within a coordinate space of said virtual environment;
   d) enabling a change in at least one of said first and second locations;
   e) modifying said video image stream to reflect said change in c); and
   f) enabling real-time video communication from said local participant to said second participant.

2. The method of video conferencing as described in claim 1, wherein c) comprises:
   c1) generating a three dimensional video model of said local participant based on said plurality of real time video streams by applying said new view synthesis technique; and
   c2) generating said video image stream of said local participant from said three dimensional model, wherein said video image stream is in two dimensions.

3. The method of video conferencing as described in claim 1, wherein d) comprises:
   d1) enabling said local participant and said second participant to navigate through said coordinate space of said virtual environment effecting said change in at least one of said first and second locations.

4. The method of video conferencing as described in claim 1, wherein f) further comprises:
   f1) sending said video image stream to said second participant for blending within a synthetic rendering of said three dimensional virtual environment from said second location.

5. The method of video conferencing as described in claim 1, further comprising:
   g) receiving a second video image stream in real-time of said second participant;
   h) receiving an input audio stream of said second participant; and
   i) blending said second video image stream within a synthetic rendering of said virtual environment.

6. The method of video conferencing as described in claim 5, wherein said second video image stream in real-time is generated by applying said new view synthesis technique on a second plurality of real-time video streams of said second participant, said second video image stream rendered from said first location of said local participant with respect to said second location of said second participant within said coordinate space of said virtual environment in order to enable real-time video conferencing between said local participant and said second participant.

7. The method of video conferencing as described in claim 5, further comprising:
   j) portraying an eye contact view of said local participant on a display viewed by said second participant during periods when said local participant is directly viewing an image of said second participant from said second video image stream.

8. The method of video conferencing as described in claim 1, wherein f) further comprises:
   f1) capturing an output audio stream in real-time of said local participant; and
   f2) sending said output audio stream to said second participant.

9. The method of video conferencing as described in claim 1, wherein said virtual environment is a conference room.

10. The method of video conferencing as described in claim 1, further comprising:
   g) generating a second video image stream in real-time of said local participant based on said plurality of real-time video streams by applying said new view synthesis technique, said second video image stream rendered from a third location of a third participant with respect to said local participant within said coordinate space of said virtual environment;
   h) enabling a change in at least one of said first and third locations;
   i) modifying said second video image stream to reflect said change in h); and
   j) enabling real-time video conferencing from said local participant to said third participant.

11. A method of communication comprising:
   a) creating a virtual environment in three dimensions;
   b) capturing a plurality of real-time video streams of a local participant from a plurality of sample viewpoints;
   c) generating a plurality of output video image streams in real-time of said local participant, to be displayed to a plurality of observing participants, by applying a new view synthesis technique to said plurality of real-time video streams, said plurality of output video image streams rendered from a plurality of observing locations of said plurality of observing participants with respect to a first location of said local participant within a coordinate space of said virtual environment;
   d) enabling changes in at least one of said first location and said plurality of observing locations;
   e) modifying corresponding output video image streams in said plurality of output video image streams to reflect said changes in c); and
   f) enabling real-time video communication in a communication session from said local participant to said plurality of observing participants.

12. The method of communication as described in claim 11, wherein c) comprises:
   generating a three dimensional video model of said local participant based on said plurality of real-time video streams for at least one of said plurality of output video image streams, a first output video image stream, said first output video image stream rendered from a first observing location of a first observing participant with respect to said first location; and
   generating said first output video image stream in two dimensions from said three dimensional video model.

13. The method of communication as described in claim 11, wherein f) further comprises:
   f1) sending said plurality of output video image streams to said plurality of observing participants for blending within a plurality of synthetic renderings corresponding to said plurality of observing participants within said virtual environment.

14. The method of communication as described in claim 11, wherein f) further comprises:
   f1) capturing an output audio stream in real-time corresponding to said local participant; and
   f2) sending said output audio stream to said plurality of observing participants.

15. The method of communication as described in claim 11, further comprising:
   g) receiving a plurality of input audio streams from said plurality of observing participants;
   h) receiving a plurality of input video image streams in real-time of said plurality of observing participants, wherein at least one of said input video image streams, a first input video image stream, is generated by applying said new view synthesis technique on a second plurality of real-time video streams of a first observing participant, said first input video image stream a first observing location of said first observing participant with respect to said first location of said local participant within said coordinate space of said virtual environment; and
   i) blending said plurality of input video image streams within a synthetic rendering of said three dimensional virtual environment.

16. The method of communication as described in claim 11, wherein said plurality of output video image streams focus on a portion of said local participant.

17. The method of communication as described in claim 11, wherein said local participant is an object.

18. The method of communication as described in claim 14, further comprising:
   modulating strengths of said plurality of input audio streams as a function of distance between said local participant and said plurality of observing participants to diminish audio interference in separate and independent side communications in said communication session.

19. The method of communication as described in claim 11, wherein a plurality of participants represented in said virtual environment includes said local participant and said observing participants, and wherein said plurality of participants are physically located in independent and remote physical locations coupled together through a communication network.

20. The method of communication as described in claim 11, wherein at least one of said plurality of observing participants is located within a localized area surrounding said local participant within said coordinate space of said virtual environment.

21. The method of communication as described in claim 12, wherein at least one of said plurality of observing participants requests participation within said communication session including said local participant and said plurality of observing participants.

22. A video conferencing station comprising:
   a plurality of video cameras for recording real-time video streams of a local participant at multiple sample viewpoints surrounding said user;
   a new view synthesis module for generating a plurality of output video image streams by applying a new view synthesis technique to said real-time video streams from said plurality of video cameras of said local participant rendered from a plurality of locations of a plurality of observing participants with respect to a first location of said local participant within a coordinate space of a virtual environment;
   an interface module for blending a plurality of input video image streams from said plurality of observing participants within a synthetic rendering of said three dimensional virtual environment; and a display for viewing said plurality of input video image streams to enable real-time video communication in a communication session between said local participant and said plurality of observing participants within said virtual environment.

23. The video conferencing station as described in claim 22, further comprising a contour extraction module for extracting said local participant from a physical background.

24. The video conferencing station as described in claim 22, further comprising a microphone for capturing an audio stream in real-time of said local participant.

25. The video conferencing station as described in claim 22, wherein said interface module receives a plurality of input audio streams in real-time associated with said plurality of observing participants for mixing into a single audio stream that is broadcast through a local speaker.

26. A method of communication comprising:
   a) simultaneously generating a first video image stream in real-time of a first participant and a second video image stream in real-time of a second participant by applying a new view synthesis technique to a first plurality of real-time video streams of said first participant and to a second plurality of real-time video streams of said second participant said first and second participants represented within a virtual environment,
   b) allowing for navigation within said virtual environment by said first and second participants;
   c) modifying said first and second video image streams to reflect said navigation in b)
   d) sending said first video image stream to said second participant;
   e) sending said second video image stream to said first participant; and
   f) enabling real-time video communication between said first and second participant within said virtual environment.

27. The method of communication as described in claim 26, wherein generating said first video image stream in real-time in a) comprises:
   a1) capturing said first plurality of real-time video streams of said first participant from a plurality of sample viewpoints;
   a2) generating said first video image stream in real-time based on said first plurality of real-time video streams by applying said new view synthesis technique, said first video image stream rendered from a second location of said second participant with respect to a first location of said first participant within a coordinate space of said virtual environment; and
   wherein b) comprises:
   b1) enabling a change in at least one of said first and second locations.

28. The method of communication as described in claim 27, further comprising:
   sending said first video image stream to said second participant for blending within a synthetic rendering of said three dimensional virtual environment.

29. The method of communication as described in claim 26, wherein generating said second video image stream in real-time in a) comprises:
   a1) capturing said second plurality of real-time video streams of said second participant from a plurality of sample viewpoints;
   a2) generating said second video image stream in real-time based on said second plurality of real-time video streams by applying said new view synthesis technique, said second video image stream rendered from a first location of said first participant with respect to a second location of said second participant within a coordinate space of said virtual environment; and
   wherein b) comprises:
   b1) enabling a change in at least one of said first and second locations.

30. The method of communication as described in claim 29, further comprising:
   sending said second video image stream to said first participant for blending within a synthetic rendering of said three dimensional virtual environment.

31. The method of communication as described in claim 26, wherein said first and second participants are located in independent and remote locations coupled together through a communication network.

32. The method of communication as described in claim 26, wherein said virtual environment is a conference room.

33. A computer system comprising:
   a processor: and
   a computer readable medium coupled to said processor and containing program instructions that, when executed, cause said processor to implement a method of video conferencing on said computer system comprising:
   a) creating a virtual environment in three dimensions;
   b) capturing a plurality of real-time video streams of a local participant from a plurality of sample viewpoints;
   c) generating a video image stream in real-time of said local participant to be displayed to a second participant by applying a new view synthesis technique to said plurality of real-time video streams, said video image stream rendered from a second location of said second participant with respect to a first location of said local participant within a coordinate space of said virtual environment;
   d) enabling a change in at least one of said first and second locations;
   e) modifying said video image stream to reflect said change in c); and
   f) enabling real-time video communication from said local participant to said second participant.

34. The computer system as described in claim 33, wherein said computer readable medium further comprises instructions in c) for performing:
   c1) generating a three dimensional video model of said local participant based on said plurality of real time video streams by applying said new view synthesis technique; and
   c2) generating said video image stream of said local participant from said three dimensional model, wherein said video image stream is in two dimensions.

35. The computer system as described in claim 33, wherein said computer readable medium further comprises instructions in d) for performing:
   d1) enabling said local participant and said second participant to navigate through said coordinate space of said virtual environment effecting said change in at least one of said first and second locations.

36. The computer system as described in claim 33, wherein said computer readable medium further comprises instructions in f) for performing:

f1) sending said video image stream to said second participant for blending within a synthetic rendering of said three dimensional virtual environment from said second location.

37. The computer system as described in claim 33, wherein said computer readable medium further comprises instructions for performing:

g) receiving a second video image stream in real-time of said second participant;

h) receiving an input audio stream of said second participant; and i) blending said second video image stream within a synthetic rendering of said virtual environment.

38. The computer system as described in claim 37, wherein said computer readable medium further comprises instructions for performing:

generating said second video image stream in real-time by applying said new view synthesis technique on a second plurality of real-time video streams of said second participant, said second video image stream rendered from said first location of said local participant with respect to said second location of said local participant within said coordinate space of said virtual environment in order to enable real-time video conferencing between said local participant and said second participant.

39. The computer system as described in claim 37, wherein said computer readable medium further comprises instructions for performing:

j) portraying an eye contact view of said local participant on a display viewed by said second participant during periods when said local participant is directly viewing an image of said second participant from said second video image stream.

40. The computer system as described in claim 33, wherein said computer readable medium further comprises instructions in f) for performing:

f1) capturing an output audio stream in real-time of said local participant; and f2) sending said output audio stream to said second participant.

41. The computer system as described in claim 33, wherein said computer readable medium further comprises instructions for performing creating said virtual environment as a conference room.

42. The computer system as described in claim 33, wherein said computer readable medium further comprises instructions for performing:

g) generating a second video image stream in real-time of said local participant based on said plurality of real-time video streams by applying said new view synthesis technique, said second video image stream rendered from a third location of a third participant with respect to said local participant within said coordinate space of said virtual environment;

h) enabling a change in at least one of said first and third locations;

i) modifying said second video image stream to reflect said change in h); and j) enabling real-time video conferencing from said local participant to said third participant.

* * * * *